United States Patent
Banerjee (10) Patent No.: US 9,690,925 B1
(45) Date of Patent: Jun. 27, 2017

(54) CONSUMPTION CONTROL OF PROTECTED CLOUD RESOURCES BY OPEN AUTHENTICATION-BASED APPLICATIONS IN END USER DEVICES

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 210 days.

(21) Appl. No.: 13/600,009

(22) Filed: Aug. 30, 2012

(51) Int. Cl.
*G06F 21/44* (2013.01)
*G06F 21/88* (2013.01)

(52) U.S. Cl.
CPC .............. *G06F 21/44* (2013.01); *G06F 21/88* (2013.01)

(58) Field of Classification Search
CPC ......... H04L 9/32; H04L 9/321; H04L 9/3213; G06F 21/00; G06F 21/70; G06F 21/88
See application file for complete search history.

(56) References Cited

U.S. PATENT DOCUMENTS

| | | | |
|---|---|---|---|
| 2006/0234676 A1* | 10/2006 | Harris ................... | H04W 12/06 455/410 |
| 2009/0205032 A1* | 8/2009 | Hinton ................ | H04L 63/0815 726/7 |
| 2009/0320117 A1* | 12/2009 | Liu ..................... | H04L 63/0807 726/9 |
| 2011/0202988 A1* | 8/2011 | Otranen ................ | H04L 9/3213 726/8 |
| 2011/0214172 A1* | 9/2011 | Hermann ............ | H04L 63/0823 726/7 |
| 2012/0108203 A1* | 5/2012 | Mechaley, Jr. ......... | H04L 63/18 455/411 |
| 2012/0110646 A1* | 5/2012 | Ajitomi et al. .................... | 726/4 |
| 2013/0104219 A1* | 4/2013 | Kumar .................... | H04L 9/321 726/9 |
| 2013/0110676 A1* | 5/2013 | Kobres .................. | G06Q 20/20 705/26.41 |
| 2013/0178190 A1* | 7/2013 | Celi, Jr. ................ | H04W 12/06 455/411 |
| 2013/0252583 A1* | 9/2013 | Brown .................. | H04W 12/06 455/411 |

OTHER PUBLICATIONS

Lami et al.,LocBiometrics—Mobile phone based multifactor biometric authentication with time and location assurance, 2010.*
Cheng, A Secure Mobile OTP Token, 2010.*

* cited by examiner

*Primary Examiner* — Eleni Shiferaw
*Assistant Examiner* — Huan V Doan
(74) *Attorney, Agent, or Firm* — Wilmer Cutler Pickering Hale and Dorr LLP (57) ABSTRACT

A server computer system identifies a request from an application hosted on a mobile device to consume a protected resource hosted by a cloud. The request is transmitted via a resource authorization protocol. The server computer system identifies a token state of an application on the mobile device. The token state is stored in a policy data store that is separate from expiration data that is stored on an access token on the mobile device. The server computer system determines whether the token state violates a security policy that is associated with a user that is assigned to the mobile device and prevents consumption of the protected resource in response to a determination that the token state violates the security policy. The server computer system allows consumption of the protected resource in response to a determination that the token state does not violate the security policy.

11 Claims, 6 Drawing Sheets

CONSUMPTION CONTROL OF PROTECTED CLOUD RESOURCES BY OPEN AUTHENTICATION-BASED APPLICATIONS IN END USER DEVICES

TECHNICAL FIELD

The present disclosure relates to OAuth (Open Authentication)-based applications, and more particularly, to controlling consumption of protected cloud resources by OAuth-based applications in end user devices.

BACKGROUND

Enterprise clouds can provide solutions to enterprises using cloud computing and software as a service (SaaS) to distribute software on a subscription basis. For example, cloud computing company Salesforce.com® can host Customer Relationship Management (CRM)/Salesforce Automation applications and services offsite via a cloud. Enterprises can use a variety of SaaS clouds to conduct their business. For example, enterprise users can access the Salesforce® cloud for CRM/Salesforce Automation services and applications. Users may use mobile devices, such as mobile phones, laptops, tablet computers, etc. to consume protected resources that are hosted on a cloud.

Users can grant mobile applications access to resources hosted in their cloud accounts using a resource authorization protocol, such as an OAuth (Open Authentication) protocol. For example, a user can authorize a contact book application running on a mobile phone to access his/her protected resources (e.g., contact list) hosted by the Salesforce.com® cloud by granting the contact book application an OAuth token. The contact book mobile application can use the OAuth token to automatically access the user's private resources stored in the Salesforce.com® cloud without the user having to expose their Salesforce.com® cloud credentials (e.g., Salesforce.com® cloud username and password), to the contact book mobile application.

A common problem is that when the mobile device is lost, the mobile device continues to use the OAuth token to automatically consume (e.g., synchronize) the protected resource (e.g., contact list) in the cloud, even after a user has changed his/her cloud service username/password. Another problem can occur when a user travels from a location, such as a European (EU) country to a non-EU country, where privacy regulations may not permit personal information to be shared across borders without express permission from the data owner. The user device may automatically download personal information (e.g., email address, phone number, address) in a contact list that is hosted on the cloud to the mobile device, which may inadvertently violate a privacy regulation.

SUMMARY

In one implementation, a system for controlling consumption of protected cloud resources by Open Authentication (OAuth)-based applications in user devices is described. An example system may include a memory and a processing device that identifies a request from an application (e.g., mobile application, web browser) hosted on a mobile device to consume a protected resource hosted by a cloud. The request is transmitted via a resource authorization protocol. The system identifies a token state of an application on the mobile device. The token state is stored in a policy data store that is separate from expiration data that is stored on an access token on the mobile device. The system determines whether the token state violates a security policy that is associated with a user that is assigned to the mobile device and prevents consumption of the protected resource in response to a determination that the token state violates the security policy. The system allows consumption of the protected resource in response to a determination that the token state does not violate the security policy.

In one implementation, preventing consumption includes the system determining that the token state in the policy data store is in an expired state. The token state in the policy data store may not match the expiration data that is stored on the access token on the mobile device which indicates that the access token is not expired. In one implementation, preventing consumption includes the system sending a message to the mobile device to obtain a new access token. In one implementation, the system receives user input indicating a password to access the protected resource has changed and assigns an expired state as the token state in the policy data store to one or more mobile devices that are associated with the user in response to the changed password.

In one implementation, the system determines whether a current geographic location of the mobile device violates the security policy of the user that is assigned to the mobile device and prevents consumption of the protected resource in response to a determination that the current geographic location violates the security policy and allowing consumption of the protected resource in response to a determination that the current geographic location does not violate the security policy. In one implementation, the resource authorization protocol is Open Authentication (OAuth) protocol. In one implementation, the system is hosted by a reverse proxy, an enterprise network proxy, or a cloud-based host machine.

Further, a method for controlling consumption of protected cloud resources by Open Authentication (OAuth)-based applications in user devices is described. In one implementation, a method comprises identifying a request from an application (e.g., mobile application, web browser) hosted on a mobile device to consume a protected resource hosted by a cloud. The request is transmitted via a resource authorization protocol. The method includes identifying a token state of the mobile device. The token state is stored in a policy data store that is separate from expiration data that is stored on an access token on the mobile device. The method includes determining whether the token state violates a security policy that is associated with a user that is assigned to the mobile device and preventing consumption of the protected resource in response to a determination that the token state violates the security policy. The method includes allowing consumption of the protected resource in response to a determination that the token state does not violate the security policy.

In addition, a non-transitory computer readable storage medium for controlling consumption of protected cloud resources by Open Authentication (OAuth)-based applications in user devices is described. An exemplary non-transitory computer readable storage medium includes instructions that will cause a processing device to perform a method that includes identifying a request from an application hosted on a mobile device to consume a protected resource hosted by a cloud. The request is transmitted via a resource authorization protocol. The method includes identifying a token state of the mobile device. The token state is stored in a policy data store that is separate from expiration data that is stored on an access token on the mobile device. The method includes determining whether the token state violates a security policy that is associated with a user that is assigned to the mobile device and preventing consumption of the protected resource in response to a determination that the token state violates the security policy. The method includes allowing consumption of the protected resource in response to a determination that the token state does not violate the security policy.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for controlling consumption of protected cloud resources in Open Authentication (OAuth)-based applications in end user devices. A user may initially grant an application (e.g., mobile application, web browser) on a mobile device (e.g., smart phone, tablet computer) automatic access to consume a protected resource in a cloud via an OAuth access token that is assigned to the application on the device. A protected resource is an access restricted resource that requires authentication and authorization before the protected resource can be accessed. For example, a protected resource may be a customer contact list that requires a username and password for access to the customer contact list. The user may wish to limit the access of the application on the mobile device to the protected resource. For example, the user may have lost a smart phone and may no longer want any application on the lost smart phone to automatically consume (download) protected resources from the cloud. The application may also on the user's other mobile devices, which are not lost, and may continue to use an OAuth token to automatically consume protected resources. In another example, the user may travel to Country-XYZ that prohibits personal identification information (e.g., email address, phone number, mailing address, etc.) from being shared across borders without express permission from the data owner. The user, while in Country-XYZ, may wish to disable the automatic consumption (download) by one or more mobile devices of personal identification information from a cloud.

Implementations of the present disclosure control consumption of protected cloud resources in OAuth-based applications in end user devices. A server computer system identifies a request from an application (e.g., mobile application, web browser) hosted on a mobile device to consume a protected resource hosted by a cloud. Examples of mobile applications can include, and are not limited to, a calendar application, a contacts application, a mail application, a word processing application, a customer resource management application, a social networking application, etc. The request can be transmitted via a resource authorization protocol. A resource authorization protocol is a protocol that authorizes authenticated entities to share protected resources with one another without having to disclose authentication credentials. An example of a resource authorization protocol is OAuth (Open Authorization) protocol. For brevity and simplicity, the OAuth protocol is used as an example of a resource authorization protocol throughout this document.

The server computer system identifies a token state of an application that is hosted on the mobile device. The token state of the application is stored in a policy data store that is separate from expiration data that is stored on an access token on the mobile device. The server computer system determines whether the token state of the application violates a security policy that is associated with a user that is assigned to the mobile device and prevents consumption of the protected resource in response to a determination that the token state violates the security policy. The server computer system allows consumption of the protected resource in response to a determination that the token state does not violate the security policy. A variety of such OAuth tokens, corresponding to different cloud services, can be stored on a mobile device. A consumption control module hosted by the server can be used to selectively allow application access to cloud services through some OAuth tokens, and to disable application access to cloud services through other OAuth tokens.

The server computer system can also determine the current geographic location of the mobile device and determine whether the current geographic location violates a security policy. The server computer system can prevent consumption of the protected resource in response to a determination that the current location violates the security policy and can allow consumption of the protected resource in response to a determination that the current location does not violate the security policy. A variety of such OAuth tokens, corresponding to different cloud services, can be stored on a mobile device. The consumption control module implemented in the server can be used to selectively allow application access to cloud services through some OAuth tokens, and disable application access to cloud services through other OAuth tokens based on the geographic location of the mobile device.

Figure 1:
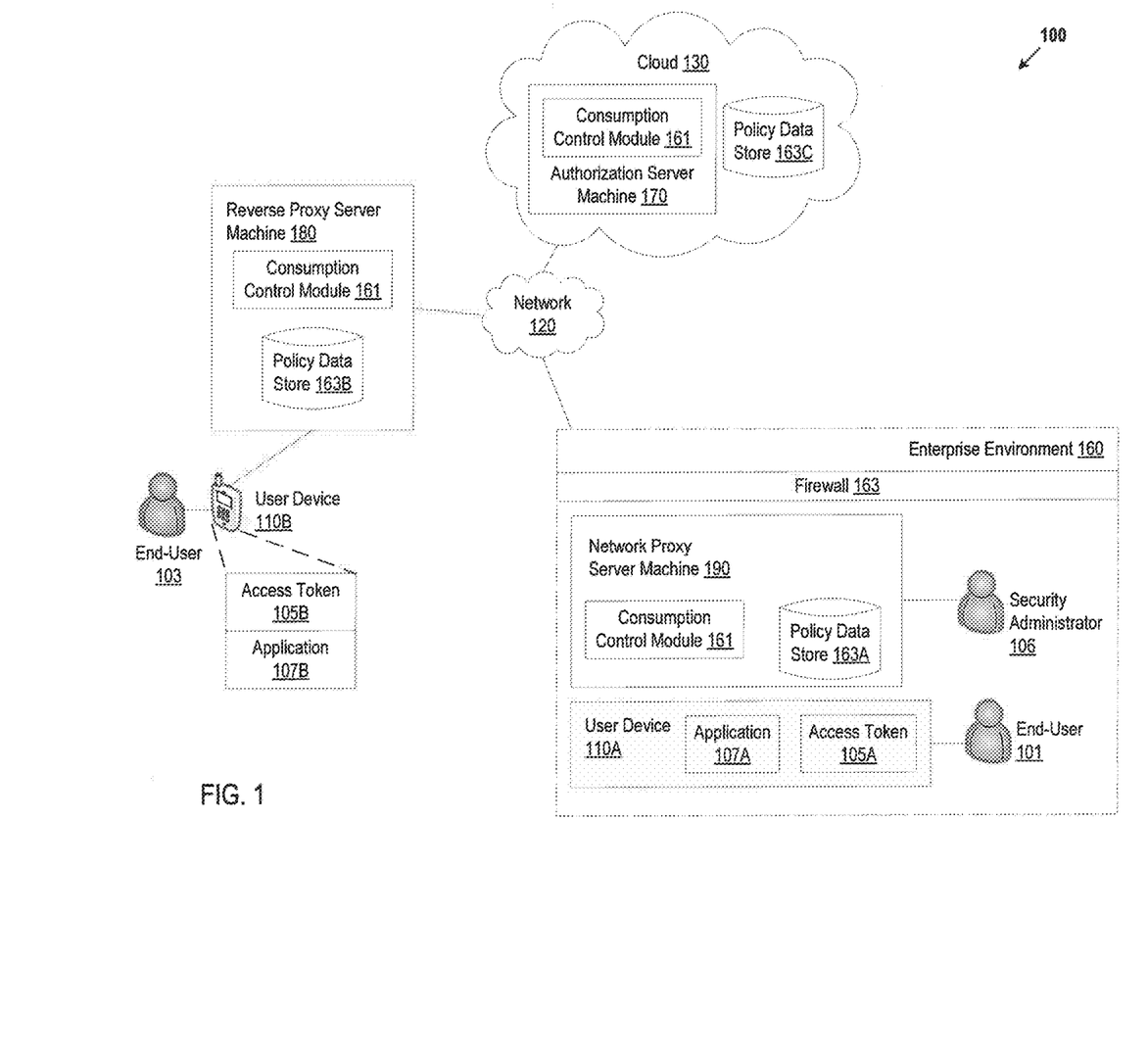
FIG. 1 illustrates example system architecture, in accordance with various implementations.

FIG. 1 is an example system architecture 100 in which implementations of the present disclosure can be implemented. The system architecture 100 can include an enterprise environment 160 including one or more user devices 110A communicating with one or more clouds 130 via a network 120. The network 120 may be a public network, a private network, or a combination thereof. Network 120 can include a wireless/cellular network. The wireless/cellular infrastructure may be provided by one or multiple wireless/cellular communications systems, such as a wireless fidelity (WiFi) hotspot connected with the network 120 and/or a wireless/cellular carrier system that can be implemented using various data processing equipment, communication towers, etc.

A cloud 130 can provide solutions to enterprises using cloud computing such as a Software-as-a-Service (SaaS) model in which cloud computing companies can distribute software on a subscription basis. A cloud 130 can include one or more authorization server machines 170 to authenticate users 101,103 and access tokens 105A-B (e.g., OAuth tokens) requesting access to protected resources in the cloud 130. The authorization server machines 170 can be hosted by any type of computing device including server computers, gateway computers, or similar computing device.

For example, cloud computing company Salesforce.com® can host CRM/Salesforce Automation applications and services offsite via cloud 130. Enterprises can use a variety of SaaS clouds 130 to conduct their business. For example, enterprise end-users 101,103 can access the Salesforce® cloud 130 for CRM/Salesforce Automation services and applications. End-users 101,103 are users of clouds 130. A user that has special access rights, such as an enterprise security administrator 106, can not only use clouds 130, but can set enterprise policies.

The enterprise environment 160 can include a firewall 163 to create a secure boundary for the enterprise. In one implementation, an end-user 101 can access the clouds 130 from within the firewall 163, also known as within the enterprise premise and 'on-premise.' A user device 110A can host an application 107A (e.g., mobile application, web browser), to access the clouds 130 from within the firewall 163.

The user devices 110A-B can be a portable computing device such as, and not limited to, mobile telephones, personal digital assistants (PDAs), portable media players, netbooks, laptop computers, tablet computers, an electronic book reader, a gaming device, and the like. The user device 110A-B can also be other types of computing devices such as a desktop computer, a set-top box, a gaming console, a television, etc. that may not traditionally be considered to be portable.

The user device 110A-B can include one or more applications 107A-B. The applications 107A-B can be OAuth-based applications that use an access token 105A-B (e.g., OAuth token) to automatically consume protected resources in the cloud 130. The applications 107A-B (e.g., mobile application, web browser) can access protected resources directly from the cloud 130 based on user privileges, which end-users 101,103 can grant to the applications 107A-B using a resource authorization protocol, such as an OAuth protocol. For example, an application 107A-B can be assigned an access token 105A-B (e.g., OAuth token). A protected resource is owned by a resource owner, such as an enterprise end-user 101,103. For example, an end-user 101, 103 can assign an access token 105A-B to an application 107A-B to grant the application 107A-B access to his/her protected resource that is hosted by the Salesforce® cloud 150. OAuth is a multi-step authorization protocol that allows end-users 101,103 to share their protected resources that are stored on a cloud 130 with an application 107A-B without having an end-user 101,103 expose his/her user credentials.

The enterprise environment 160 can include one or more network proxy server machines 190 that can detect and intercept the resource authorization messages (e.g., OAuth messages) being directed to an application 107A-B (e.g., mobile application, web browser) on a user device 110A. The resource authorization traffic (e.g., OAuth traffic) intercepted by the network proxy server machines 190 can include resource authorization messages, such as OAuth messages, which relate to a request to consume a protected resource on the cloud 130.

The network proxy server machines 190 can include a consumption control module 161 to determine whether to allow an application 107A running on a user device 110A to consume a protected resource in the cloud 130. The consumption control module 161 can use the intercepted resource authorization messages to identify a request from an application 107 (e.g., mobile application, web browser) to consume the protected resource. The consumption control module 161 can determine whether one or more parameters of the user device 110A violate a policy that is associated with the user that is assigned to the user device 110A. The policy can be stored in a policy data store 163A-C that is coupled to the consumption control module 161.

For example, the parameter may be a token state for a token that is granted to an application 107A running on the user device 110A. The token state for the application 107A can be stored in the policy data store 163A that is separate from expiration data that is stored on an access token 105A on the user device 110A. One implementation of using a token state to control consumption of cloud resources by OAuth-based applications is described in greater detail below in conjunction with FIG. 4. In another example, the parameter may be current geographic location of the user device (e.g., user device 110A). One implementation of using a location of a user device to control consumption of cloud resources by OAuth-based applications is described in greater detail below in conjunction with FIG. 5. If a parameter violates a policy, the consumption control module 161 can prevent the application 107A running on the user device 110A from consuming the protected resource. If the parameter(s) do not violate the policy, the consumption control module 161 can allow the application 107A on the user device 110A to consume the protected resource.

The one or more network proxy server machines 190 can communicate to the user device 110A via a network (not shown). The network proxy server machines 190 may be web proxies. The network proxy server machines 190 can be deployed and managed by an enterprise. The network proxy server machines 190 can be implemented behind a firewall 163 between an application 107A (e.g., mobile application, web browser) and the clouds 130. The network proxy server machines 190 can be hosted on computing devices including server computers, gateway computers, or similar computing devices.

In one implementation, an enterprise end-user, such as end-user 103, can use a user device 110B which communicates with one or more clouds 130 from outside the enterprise firewall 163, also known as outside the enterprise premise and 'off-premise'. A user device 110B can communicate to the clouds 130 from outside the enterprise firewall 163 via one or more reverse proxy server machines 180 or forward proxy server machines. A user device 110B can host an application (e.g., mobile application, web browser) to access the clouds 130 via a reverse proxy server machine 180 or a forward proxy server machine. A user device 110B can be provisioned with URLs (uniform resource locators) of the service names of the clouds 130. The service names can force the user device 110B to connect to a reverse proxy server machine 180 or forward proxy server machine to communicate to the clouds 130.

The one or more reverse proxy server machines 180 or forward proxy server machines can detect and intercept off-premise resource authorization traffic (e.g., OAuth traffic), for example, between a user device 110B and the clouds 130. The reverse proxy server machines 180 or forward proxy server machines can intercept resource authorization messages occurring outside the firewall 163. The reverse proxy server machines 180 or forward proxy server machines can include a consumption control module 161 to determine whether to allow an application 107B executing on a user device 110B to consume a protected resource in the cloud 130. For example, the consumption control module 161 can use the token state for the application 107B in the policy data store 163B or the geographic location of the user device 110B to determine whether to allow the application 107B on the user device 110B to consume the protected resource in the cloud 130. The consumption control module 161 can use policy data that is stored in a policy data store 163B that is coupled to the consumption control module 161. The reverse proxy server machines 180 or forward proxy server machines can be deployed and managed by an enterprise. The reverse proxy server machines 180 or forward proxy server machines can be hosted by any type of computing device including server computers, gateway computers, or similar computing devices.

In one implementation, the consumption control module 161 resides in an authentication server machine 170 in the cloud 130. The consumption control module 161 can receive resource authorization traffic (e.g., OAuth traffic), for example, from user devices 110A-B and/or proxy server machines 180,190. The consumption control module 161 can use policy data in a policy data store 163C that is coupled to the consumption control module 161 to determine whether to allow an application 107A-B executing on a user device 110A-B to consume a protected resource in the cloud 130. The consumption control modules 161 can synchronize the policy data in the various policy data stores 163A-C.

In one implementation, the network proxy server machine 190 includes an identity authentication system, such as, a Single Sign-On (SSO) system. The SSO system can allow a user 101 to login to a corresponding local enterprise network in the enterprise environment 160 using a single set of credentials and have access, according to access policies, to the cloud services provided by the clouds 130 without having to individually login to each cloud service.

Figure 2:
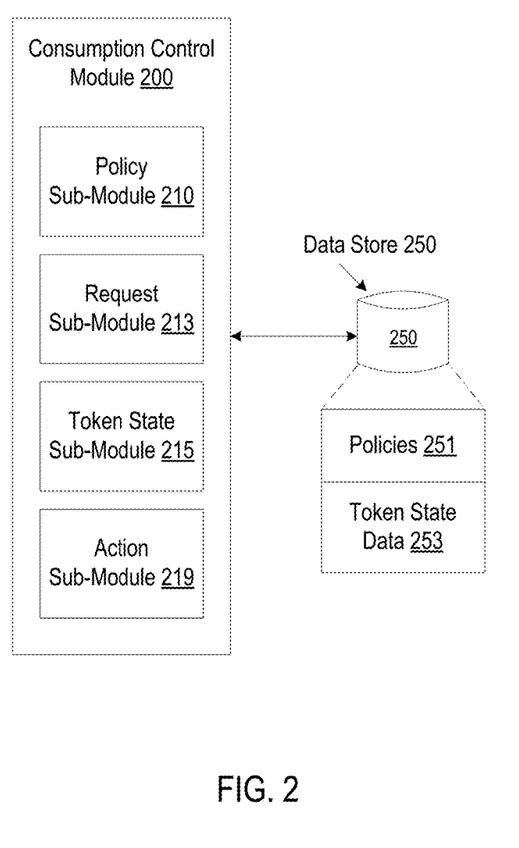
FIG. 2 is a block diagram of an implementation of a consumption control module.

FIG. 2 is a block diagram of one implementation of consumption control module 200. The consumption control module 200 may be the same as the consumption control module 161 in a server machine 170,180,190 of FIG. 1. The consumption control module 200 can include a policy sub-module 210, a request sub-module 213, a token state sub-module 215, and an action sub-module 219. The sub-modules can be combined together or separated in further sub-modules, according to a particular implementation.

The policy sub-module 210 can identify a user request to change a user credential (e.g., password) for a protected resource. In one implementation, the policy sub-module 210 is hosted on an authorization server in a cloud and the policy sub-module 210 receives a user request to change the user credential. In another implementation, the policy sub-module 210 is hosted on a reverse proxy server and/or a network proxy server and the policy sub-module 210 receives data from the authorization server in the cloud indicating that a user has requested to change the user credential (e.g., password) and/or the policy sub-module 210 intercepts a user request to change the user credential sent by a mobile device to the authorization server in the cloud.

The policy sub-module 210 can determine from one or more policies 251 that are stored in a data store 250 that is coupled to the consumption control module 200 that the token states for one or more access tokens that are assigned to applications on a mobile device should be changed to an "expired" state in response to the changed user credential (e.g., password).

Enterprises can define and store one or more policies 251 to specify, for example, what action should be taken when a user changes a user credential for a protected resource, what action should be taken when a mobile device is in a particular geographic location (e.g., country, state, city, etc.) and requests to consume a protected resource, and what action should be taken when a token state for a token that is assigned to an application (e.g., mobile application, web application) is in an "expired" state, etc. There can be one or more policies 251 for each cloud user. The security policies 251 can include a mobile device identifier of mobile devices that correspond to the cloud user.

The request sub-module 213 can identify a request (e.g., consumption request) made by an application (e.g., mobile application, web application) to consume a protected resource in a cloud. The request sub-module 213 can analyze resource authorization messages (e.g., OAuth messages) that are being intercepted by a proxy and identify a consumption request from the resource authorization messages. The request sub-module 213 can receive resource authorization messages (e.g., OAuth messages) at a cloud and identify a consumption request from the resource authorization messages.

The token state sub-module 215 can examine token state data 253 that is stored in the data store 250 to determine a current state of an access token that is assigned to an application on a mobile device. The token state data 253 is data that is separate from expiration data that is stored on an access token (e.g., OAuth token) on the mobile device. The token state data 253 can include a mobile device identifier and a token state (e.g., "expired," "valid") that corresponds to the mobile device identifier. The token state sub-module 215 can locate a mobile device identifier in the consumption request and locate a matching mobile device identifier in the token state data 253.

The policy sub-module 210 can determine whether the token state violates a policy 251 that corresponds to the mobile device identifier and the action sub-module 219 can take appropriate action based on the determination. For example, the current token state that is stored in the data store 250 may be "expired." A policy 251 may indicate that only unexpired token states may be permitted to consume a protected resource.

The policy sub-module 210 can use the current geographic location of a mobile device requesting to consume a protected resource to determine whether the current location violates a policy 251 that corresponds to the mobile device identifier in the consumption request. For example, the policy 251 may include a list of locations (e.g., list of countries, list of cities, etc.) where the mobile device, if located in one of the listed locations, is prohibited from consuming the protected resource. For example, Country-XYZ may not permit personal identity information (e.g., phone number, email address, physical address, etc.) to be shared across borders without express permission from the data owner.

The action sub-module 215 can perform one or more actions based on a policy 251. A policy 251 can include a set of rules that specify, for example, which actions should be taken when the rules are satisfied and when the rules are not satisfied. For example, the policy 251 may indicate that when a user request to change a user credential (e.g., password) is received, the token state for any mobile devices that are associated with a user should be changed to an "expired" state in the token state data 253. In another example, the policy 251 may indicate that access to the protected resources should be blocked, reported, etc. when the rules are not satisfied and that access to the protected resources should be allowed when the rules are satisfied.

Examples of an action can include, and are not limited to, allowing an application (e.g., mobile application, web application) access to a protected resource, denying an application access to a protected resource, sending a notification to one or more users indicating access is denied, sending a notification to one or more users indicating a new access token should be obtained, etc.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
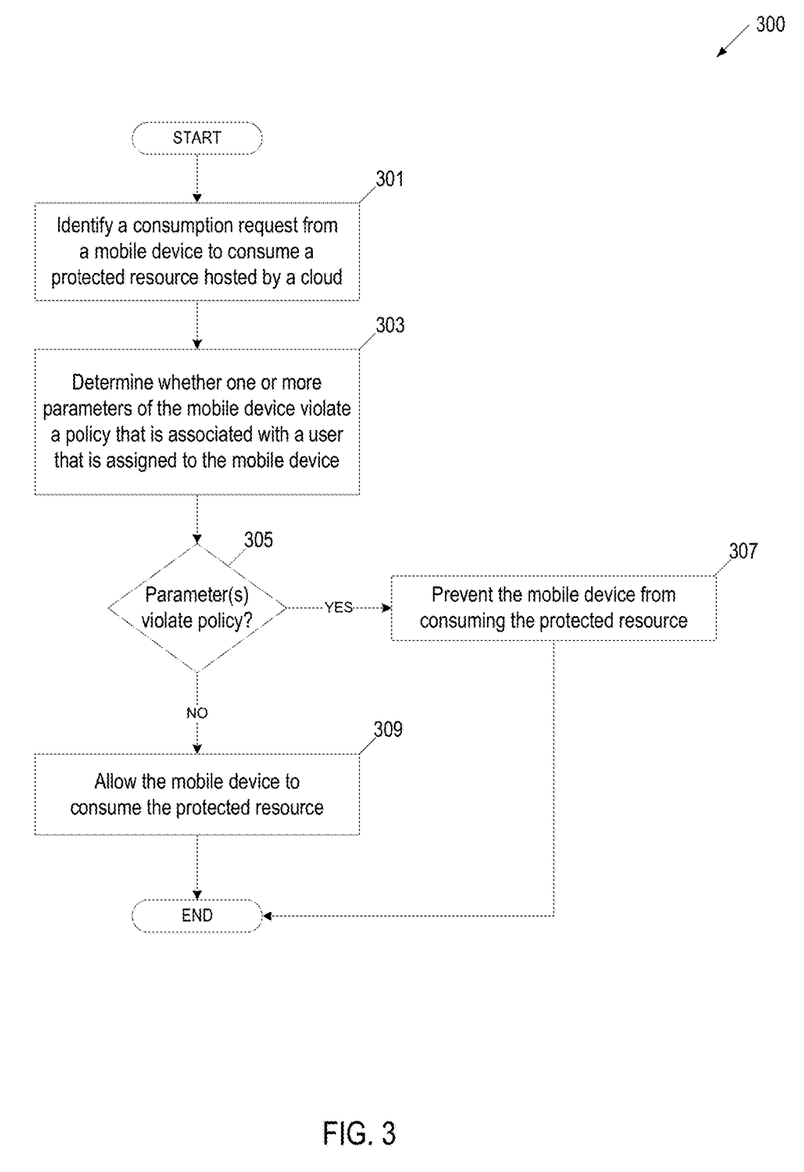
FIG. 3 is a flow diagram illustrating an implementation for a method for controlling consumption of protected cloud resources by OAuth-based applications in user devices.

FIG. 3 is a flow diagram of an implementation of a method 300 for controlling consumption of protected cloud resources by OAuth-based applications in user devices. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a consumption control module 161 in a server machine 170,180,190 of FIG. 1.

At block 301, processing logic identifies a consumption request from a mobile device to consume a protected resource hosted by a cloud. The consumption request can be made by an application (e.g., mobile application, web application) sending a resource authorization message. Processing logic can analyze resource authorization messages (e.g., OAuth messages) that are being intercepted by a proxy and can identify a consumption request from the resource authorization messages. Processing logic can receive resource authorization messages (e.g., OAuth messages) at a cloud and can identify a consumption request from the resource authorization messages.

The consumption request can include an access token, which automatically grants the application access to protected resource. An access token allows an enterprise end-user to grant an application (e.g., mobile application, web application) cloud access to their information stored with a cloud, without sharing their access credentials (e.g., username and password). An access token can be a string denoting an expiration state, and other access attributes. For example, an access token may include data describing that the access token is not expired. An access token can be an OAuth token.

At block 303, processing logic determines whether one or more parameters of the mobile device violate a policy that is associated with a user that is assigned to the mobile device. For example, the parameter may be a token state for a token that is granted to an application residing on the mobile device. The token state for the application on a particular mobile device can be stored in policy data that is separate from expiration data that is stored on an access token on the mobile device. One implementation of using a token state to control consumption of cloud resources by OAuth-based applications is described in greater detail below in conjunction with FIG. 4. In another example, the parameter may be a current geographic location of the mobile device. One implementation of using a location of a user device to control consumption of cloud resources by OAuth-based applications is described in greater detail below in conjunction with FIG. 5.

Processing logic can determine whether any parameter or any combination of parameters violate one or more policies. If a parameter violates a policy, processing logic prevents the application on the mobile device from consuming the protected resource at block 307. If the parameter(s) do not violate the policy, processing logic allows the application on the mobile device to consume the protected resource at block 309.

Figure 4:
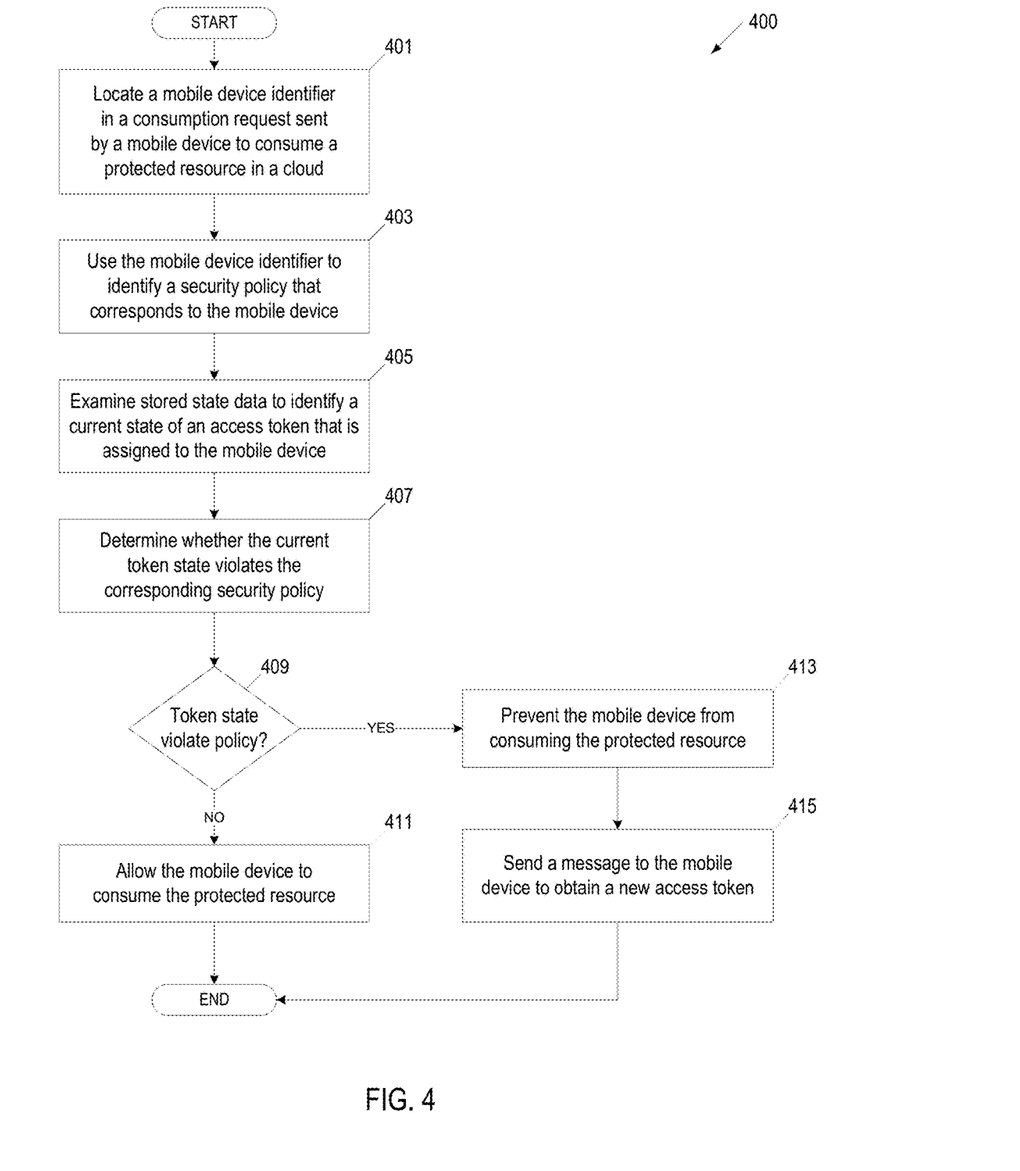
FIG. 4 is a flow diagram illustrating an implementation for a method for using a token state to control consumption of cloud resources by OAuth-based applications in user devices.

FIG. 4 is a flow diagram of an implementation of a method 400 for using a token state to control consumption of cloud resources by OAuth-based applications in user devices. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a consumption control module 161 in a server machine 170,180,190 of FIG. 1.

At block 401, processing logic locates a mobile device identifier in a consumption request that is sent by a mobile device. The consumption request can be a request from an application (e.g., mobile application, web browser) running on the mobile device to consume a protected resource in a cloud. The request can be made via the OAuth protocol and can include a mobile device identifier and an access token (e.g., OAuth token). At block 403, processing logic uses the mobile device identifier to identify a security policy that corresponds to the mobile device. A data store that is coupled to the consumption control module can store one or more security policies for each user using a mobile device to consume protected resources in a cloud. Processing logic can locate a mobile device identifier in the data store that matches the mobile device identifier in the request.

At block 405, processing logic uses the mobile device identifier to locate and examine token state data that is stored in the data store to identify a current state of an access token that is assigned to the application on the mobile device. Examples of a current state of an access token can include, and are not limited to, "expired" and "valid." The data store can store token state data that can be managed, for example, by a system administrator (e.g., enterprise system administrator, cloud system administrator). The system administrator can change the token state data for one or more access tokens that are assigned to a mobile device to "expired," for example, when a user changes a cloud password. For example, a user, John Smith, may have lost his smart phone having a serial number "C44GKPH1DTD0." John Smith may have changed his cloud account password. The access tokens on his lost smart phone may still be valid (e.g., may have not expired) and may still continue to automatic consume (download) data from the cloud accounts via the access tokens, even though John Smith has changed his cloud account password. In response to John Smith changing his cloud account password, the policy that is associated with John Smith may indicate that a system administrator should change the token state data for the access tokens that are assigned to the applications on John Smith's smart phone having a serial number "C44GKPH1DTD0" to "expired." In one implementation, processing logic automatically changes the token state data for the access tokens that are assigned to the applications on a user's particular mobile device to "expired" based on the policy.

At block 407, processing logic determines whether the current token state violates the corresponding security policy. For example, the current token state that is stored in the data store may be "expired" and the policy may indicate that only applications on mobile devices that have unexpired token states that are stored in the data store are permitted to consume a protected resource.

Processing logic can perform one or more actions based on whether the token state violates the policy. Examples of an action can include, and are not limited to, allowing an application on the mobile device access to a protected resource, denying an application on the mobile device access to a protected resource, sending a notification to one or more users (e.g., end-users, security administrators, system administrators, etc.), etc. If the token state does not violate the policy (block 409), processing logic allows the application on the mobile device to consume the protected resource at block 411. If the token state violate the policy (block 409), processing logic prevents the application on the mobile device from consuming the protected resource at block 413, and sends a message to the mobile device to obtain a new access token at block 415. Processing logic can send a token-expired message to the mobile device indicating that the mobile device should be re-authenticated. Examples of a message can include, and are not limited to, messages communicated over a network (e.g., email messages, text messages, instant messages, social network messages, etc.), visual/sound alarm indicators on a computer system, etc.

Figure 5:
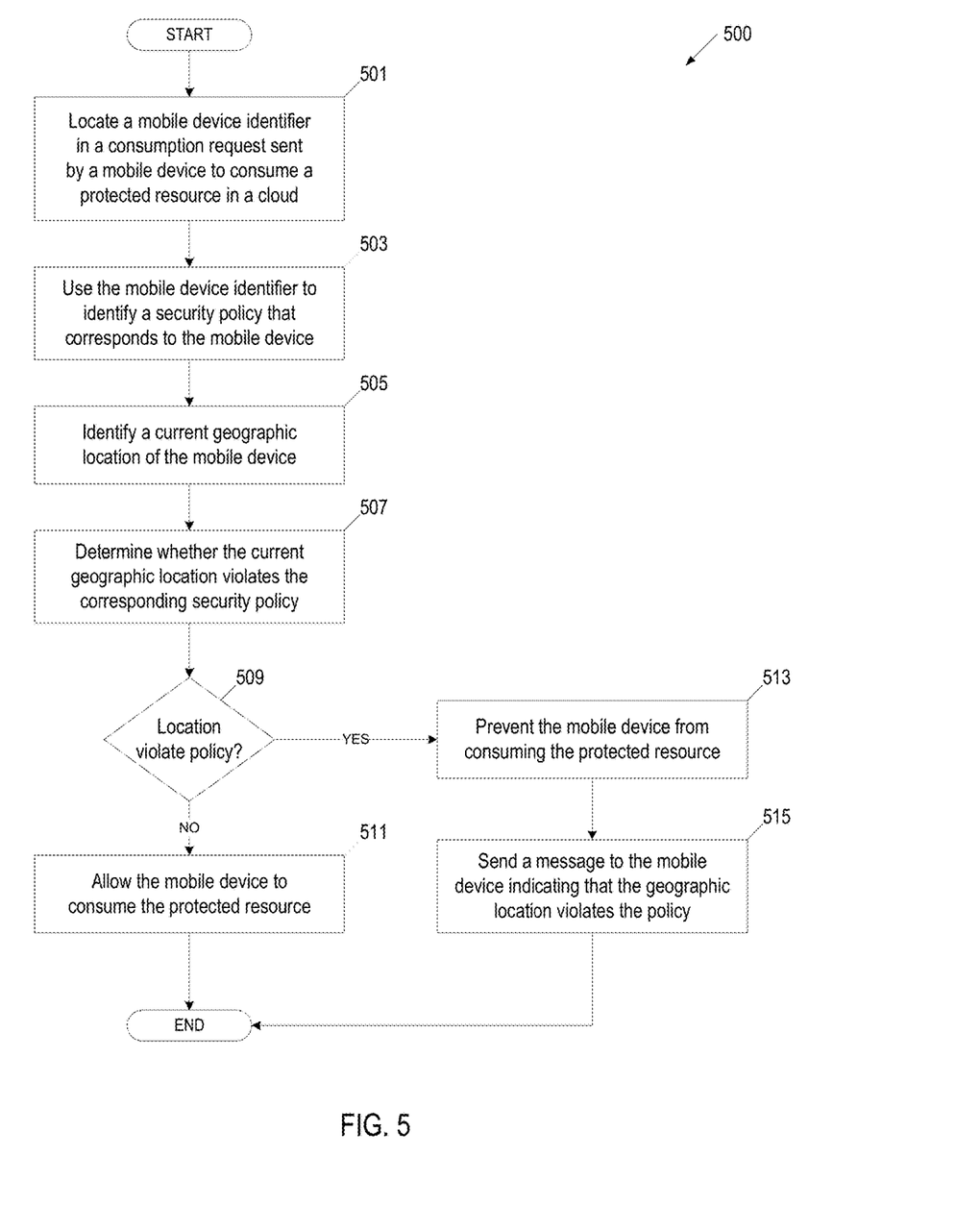
FIG. 5 is a flow diagram illustrating an implementation for a method for using a location of a user device to control consumption of cloud resources by OAuth-based applications in user devices.

FIG. 5 is a flow diagram of an implementation of a method 500 for using a current physical location of a user device to control consumption of cloud resources by OAuth-based applications in the user device. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a consumption control module 161 in a server machine 170,180,190 of FIG. 1.

At block 501, processing logic locates a mobile device identifier in a consumption request that is sent by a mobile device. The consumption request can be a message with an OAuth token from an application (e.g., mobile application, web browser) running on the mobile device to consume a protected resource in a cloud. At block 503, processing logic uses the mobile device identifier to identify a security policy that corresponds to the mobile device.

At block 505, processing logic identifies a current geographic location of the mobile device. Processing logic can identify the current geographic location from the global positioning system of the mobile device. At block 507, processing logic determines whether the current geographic location violates the corresponding security policy for the resource being accessed. For example, the policy may specify locations (e.g., list of countries, list of cities, etc.) where the mobile device, if located in one of the specified locations, is prohibited from consuming the protected resource. For example, Country-XYZ may not permit personal identity information (e.g., phone number, email address, physical address, etc.) to be shared across borders without express permission from the data owner.

If the current geographic location does not violate the policy (block 509), processing logic allows the application on the mobile device to consume the protected resource at block 511. If the current geographic location violates the policy (block 509), processing logic prevents the application on the mobile device from consuming the protected resource at block 513, and sends a message to the mobile device indicating that the geographic location violates the policy at block 515. Examples of a message can include, and are not limited to, messages communicated over a network (e.g., email messages, text messages, instant messages, social network messages, etc.), visual/sound alarm indicators on a computer system, etc.

Figure 6:
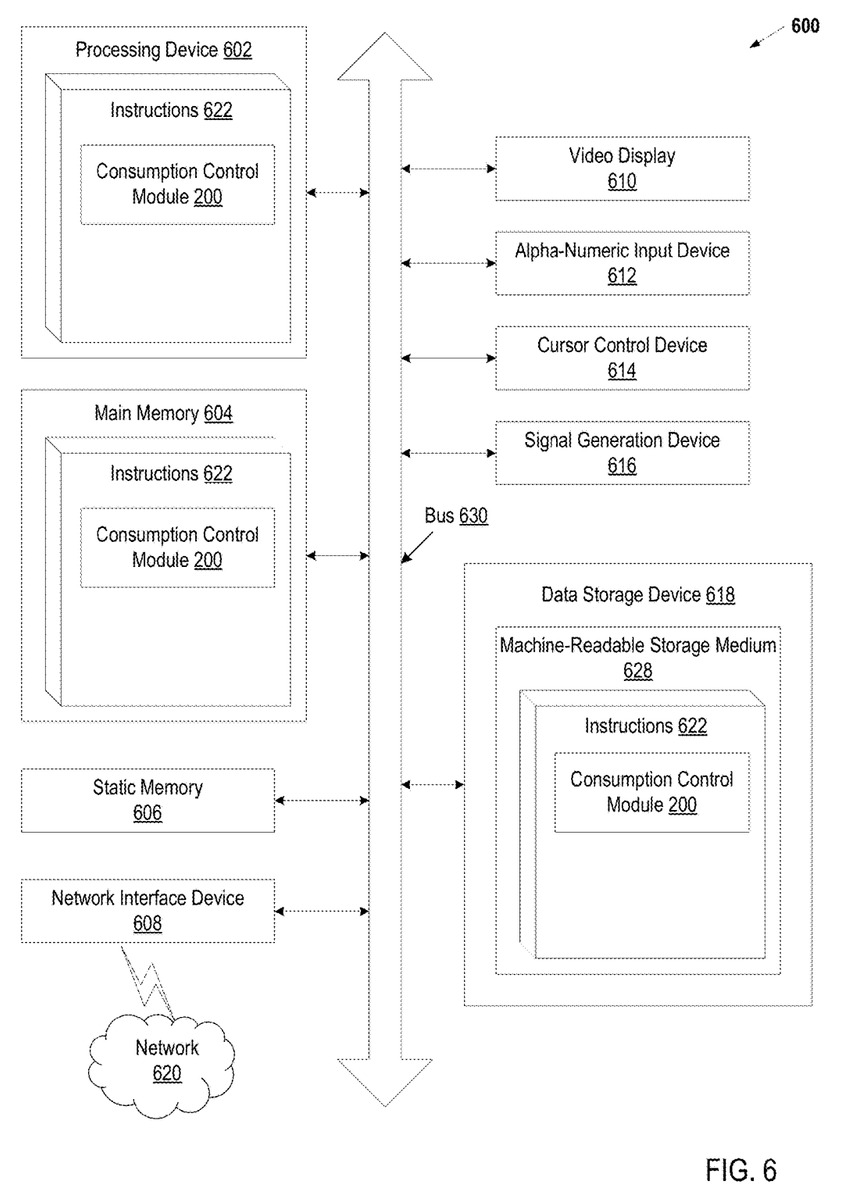
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions 622 or software embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a consumption control module (e.g., consumption control module 200 of FIG. 2) and/or a software library containing methods that call modules in a consumption control module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "preventing" or "allowing" or "sending" or "receiving" or "assigning" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

intercepting, at a proxy server computer system, resource authorization traffic between an application hosted on a mobile device and an authorization server in a cloud, wherein the traffic is associated with a request from the application to consume a protected resource hosted by the cloud, wherein the application is associated with one or more access tokens specific to the application;

identifying, by a processing device of the proxy server computer system, a token state associated with the application on the mobile device, wherein the token state is identified using an identifier of the mobile device, wherein the token state is stored independent from expiration data stored on the one or more access tokens associated with the application, and wherein the token state is stored in a first policy data store associated with the proxy server computer system;

identifying, by the processing device and using the identifier of the mobile device, at least one security policy stored in the first policy data store and associated with a user assigned to the mobile device, wherein the at least one security policy specifies at least one geographic location at which the protected resource may not be consumed;

determining whether the token state or a current geographic location of the mobile device violates the at least one security policy;

preventing consumption of the protected resource by the application in response to a determination that the token state or the current geographic location violates the at least one security policy without affecting the consumption of other protected resources by other applications hosted on the mobile device, and allowing consumption of the protected resource in response to a determination that the token state and the current geographic location do not violate the at least one security policy;

synchronizing policy data stored in the first policy data store and a second policy data store associated with the authorization server in the cloud;

receiving user input indicating a password to access the protected resource has changed; and assigning an expired state as the token state in the first policy data store to one or more mobile devices that are associated with the user in response to the changed password.

2. The method of claim 1, wherein preventing consumption comprises:
determining that the token state is in an expired state, wherein the token state does not match the expiration data that is stored on the one or more access tokens.

3. The method of claim 1, wherein preventing consumption comprises:
sending a message to the mobile device to obtain a new access token.

4. The method of claim 1, wherein the resource authorization protocol is Open Authentication (OAuth) protocol.

5. A proxy server computer system comprising:
a first memory associated with the proxy server computer system configured to store a token state associated with an application of a mobile device and at least one security policy associated with a user assigned to the mobile device, wherein the token state and the at least one security policy are identified using an identifier of the mobile device, wherein the token state is stored independent from expiration data stored on one or more access tokens specific to the application; and
a processing device coupled with the first memory to:
intercept resource authorization traffic between the application hosted on the mobile device and an authorization server in a cloud, wherein the traffic is associated with a request from the application to consume a protected resource hosted by the cloud, wherein the application is associated with the one or more access tokens specific to the application;
identify the token state associated with the application on the mobile device from the first memory;
identify, using the identifier of the mobile device, the at least one security policy associated with the user from the first memory, wherein the at least one security policy specifies at least one geographic location at which the protected resource may not be consumed;
determine whether the token state or a current geographic location of the mobile device violates the at least one security policy;
prevent consumption of the protected resource by the application in response to a determination that the token state or the current geographic location violates the at least one security policy without affecting the consumption of other protected resources by other applications hosted on the mobile device, and allow consumption of the protected resource in response to a determination that the token state and the current geographic location do not violate the at least one security policy;
synchronize policy data stored in the first memory and a second memory associated with the authorization server in the cloud;
receive user input indicating a password to access the protected resource has changed; and
assign an expired state as the token state in the first memory to one or more mobile devices that are associated with the user in response to the changed password.

6. The system of claim 5, wherein preventing consumption comprises:
determining that the token state is in an expired state, wherein the token state does not match the expiration data that is stored on the one or more access tokens.

7. The system of claim 5, wherein preventing consumption comprises:
sending a message to the mobile device to obtain a new access token.

8. The system of claim 5, wherein the resource authorization protocol is Open Authentication (OAuth) protocol.

9. A non-transitory computer readable storage medium including instructions that, when executed by a processing device at a proxy server computer system, cause the processing device to perform operations comprising:
intercepting resource authorization traffic between an application hosted on a mobile device and an authorization server in a cloud, wherein the traffic is associated with a request from the application to consume a protected resource hosted by the cloud, wherein the application is associated with one or more access tokens specific to the application;
identifying, by the processing device of the proxy server computer system, a token state associated with the application on the mobile device, wherein the token state is identified using an identifier of the mobile device, wherein the token state is stored independent from expiration data stored on the one or more access tokens, and wherein the token state is stored in a first policy data store associated with the proxy server computer system;
identifying, by the processing device and using the identifier of the mobile device, at least one security policy stored in the first policy data store and associated with a user assigned to the mobile device, wherein the at least one security policy specifies at least one geographic location at which the protected resource may not be consumed;
determining, by the processing device, whether the token state or a current geographic location of the mobile device violates the at least one security policy;
preventing consumption of the protected resource by the application in response to a determination that the token state or the current geographic location violates the at least one security policy without affecting the consumption of other protected resources by other applications hosted on the mobile device, and allowing consumption of the protected resource in response to a determination that the token state and the current geographic location do not violate the at least one security policy;
synchronizing policy data stored in the first policy data store and a second policy data store associated with the authorization server in the cloud;
receiving user input indicating a password to access the protected resource has changed; and
assigning an expired state as the token state in the policy data store to one or more mobile devices that are associated with the user in response to the changed password.

10. The non-transitory computer readable storage medium of claim 9, wherein preventing consumption comprises:
determining that the token state is in an expired state, wherein the token state does not match the expiration data that is stored on the one or more access tokens.

11. The non-transitory computer readable storage medium of claim 9, wherein the resource authorization protocol is Open Authentication (OAuth) protocol.

* * * * *